(12) United States Patent
Johnson

(10) Patent No.: US 10,467,908 B2
(45) Date of Patent: Nov. 5, 2019

(54) AUTONOMOUS BOAT DESIGN FOR TANDEM TOWING

(71) Applicant: Sea Machines Robotics, Inc., Boston, MA (US)

(72) Inventor: Michael Gordon Johnson, Boston, MA (US)

(73) Assignee: Sea Machines Robotics, Inc., Boston, MA (US)

(*) Notice: Subject to any disclaimer, the term of this patent is extended or adjusted under 35 U.S.C. 154(b) by 0 days.

(21) Appl. No.: 15/478,729

(22) Filed: Apr. 4, 2017

(65) Prior Publication Data

US 2017/0293302 A1     Oct. 12, 2017

(51) Int. Cl.
  *G05D 1/02* (2006.01)
  *G08G 3/02* (2006.01)
  *B63B 35/00* (2006.01)

(52) U.S. Cl.
  CPC ............... *G08G 3/02* (2013.01); *B63B 35/00* (2013.01); *G05D 1/0206* (2013.01); *B63B 2035/007* (2013.01); *B63B 2035/008* (2013.01)

(58) Field of Classification Search
  CPC ..................................................... G05D 1/021
  See application file for complete search history.

(56) References Cited

U.S. PATENT DOCUMENTS

| | | | |
|---|---|---|---|
| 4,200,052 A * | 4/1980 | Cunningham | B63B 21/00 114/144 B |
| 4,581,723 A * | 4/1986 | Savit | G01V 1/38 254/274 |
| 5,713,293 A | 2/1998 | Shiffler et al. | |
| 6,269,763 B1 * | 8/2001 | Woodland | A62C 29/00 114/144 A |
| 7,290,496 B2 | 11/2007 | Asfar et al. | |
| 9,164,508 B1 | 10/2015 | Takach, Jr. | |
| 9,862,396 B2 * | 1/2018 | Nandedkar | B61L 25/021 |
| 2015/0071039 A1 | 3/2015 | Rahkonen et al. | |
| 2017/0291670 A1 | 10/2017 | Johnson | |

FOREIGN PATENT DOCUMENTS

| | | | |
|---|---|---|---|
| WO | 2017129863 A1 | 8/2017 | |
| WO | WO-2018004353 A1 * | 1/2018 | ............. B63B 21/56 |

* cited by examiner

*Primary Examiner* — Hussein Elchanti
*Assistant Examiner* — Michael A Berns
(74) *Attorney, Agent, or Firm* — Goodwin Procter LLP

(57) ABSTRACT

A boat that operate autonomously or by remote control, and may be operated without on-board personnel (unmanned) or may be operated in conjunction with onboard personnel, and to methods of using such boats at sea.

18 Claims, 17 Drawing Sheets

System Block Diagram

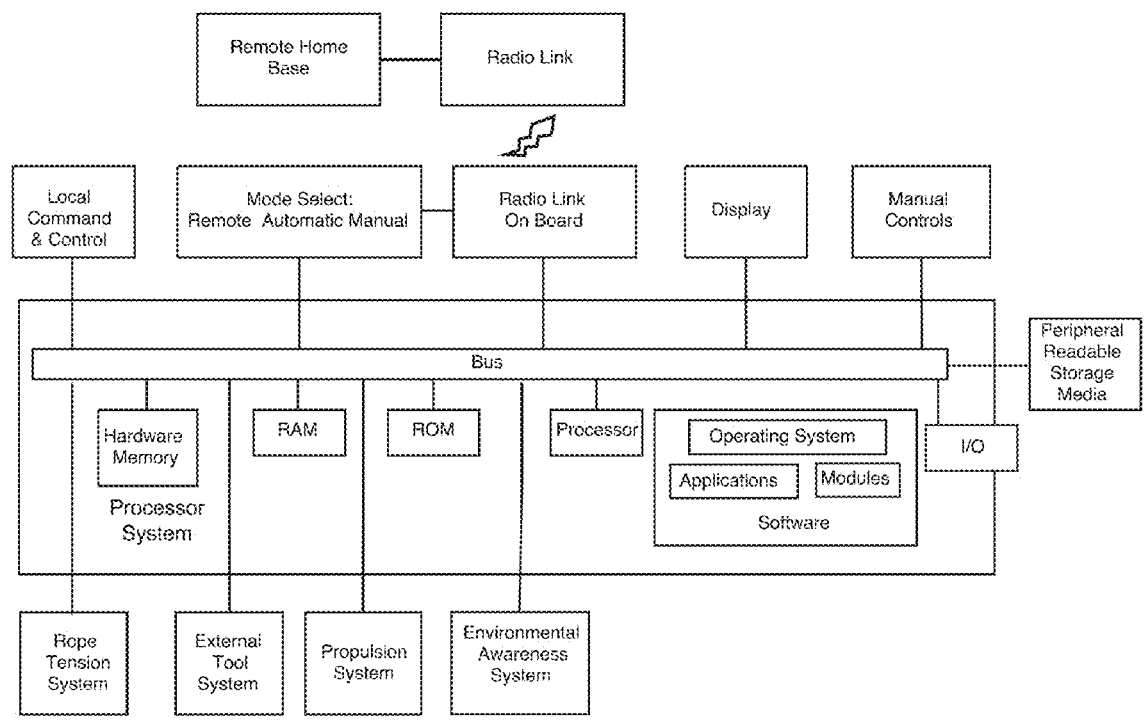
Fig. 1 System Block Diagram

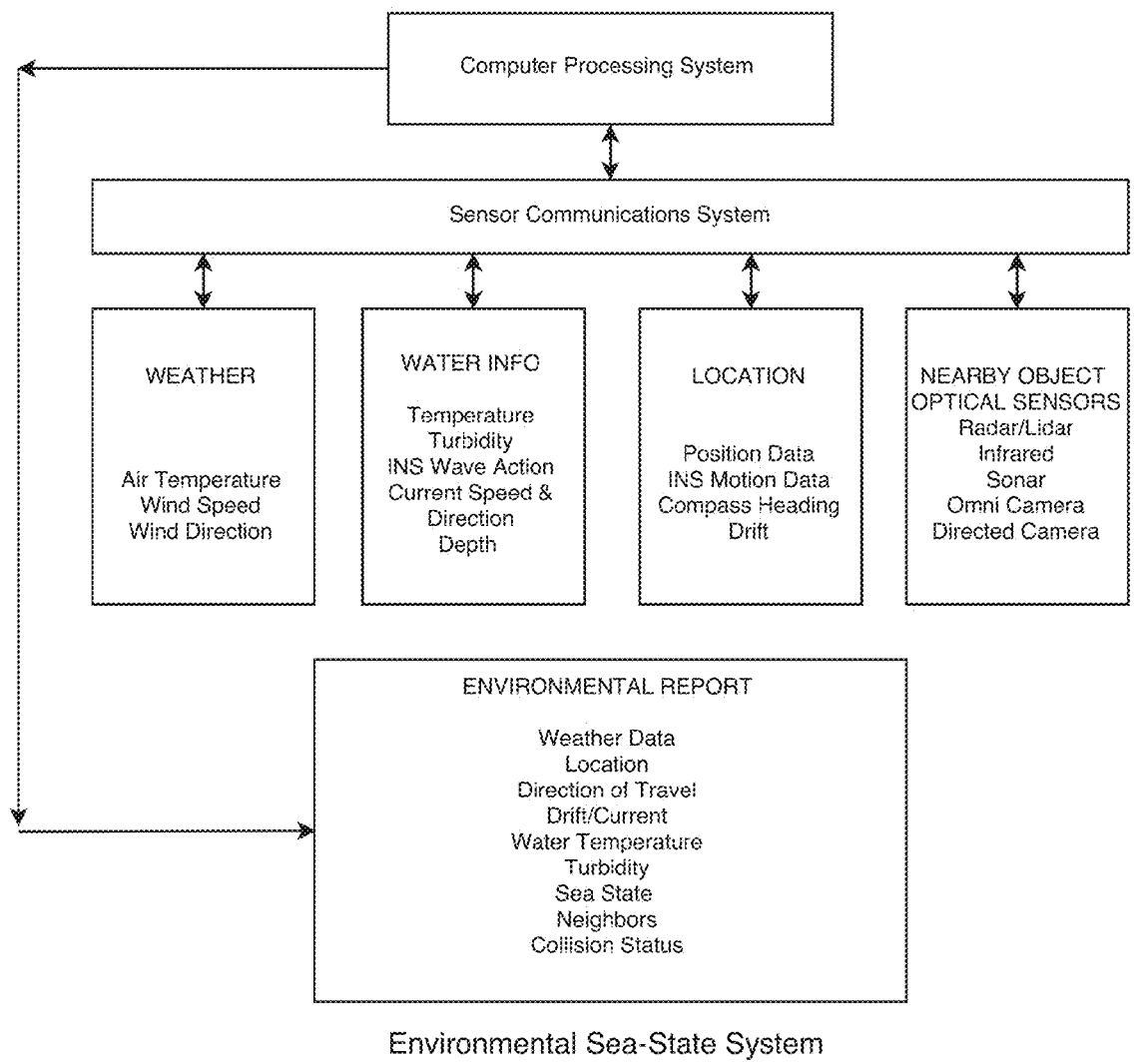
Fig. 2A Environmental Awareness System

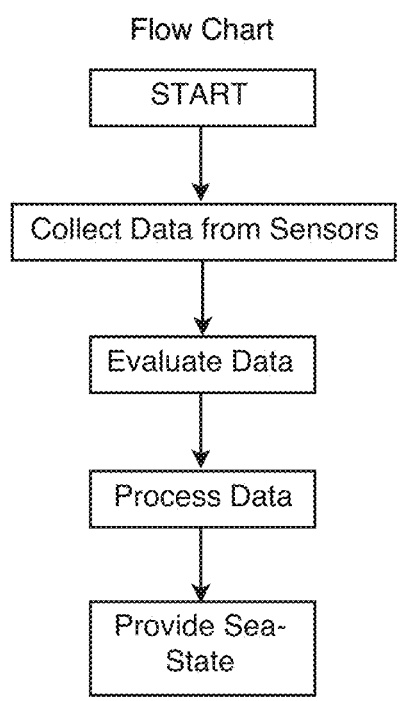
Fig. 2B Flow Chart for Performing Environmental Awareness Determination

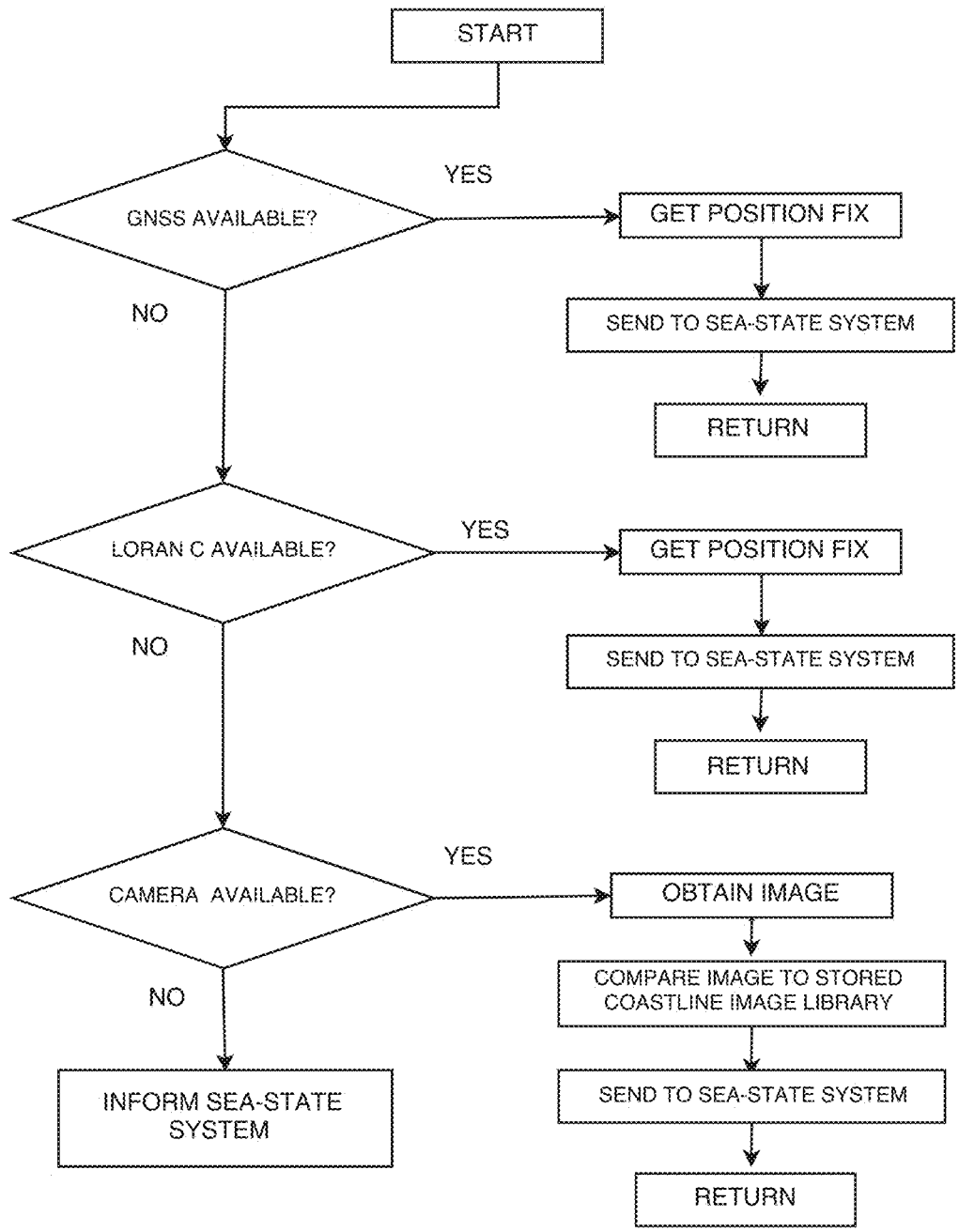
Fig. 3 Where Am I?
Determination of Location

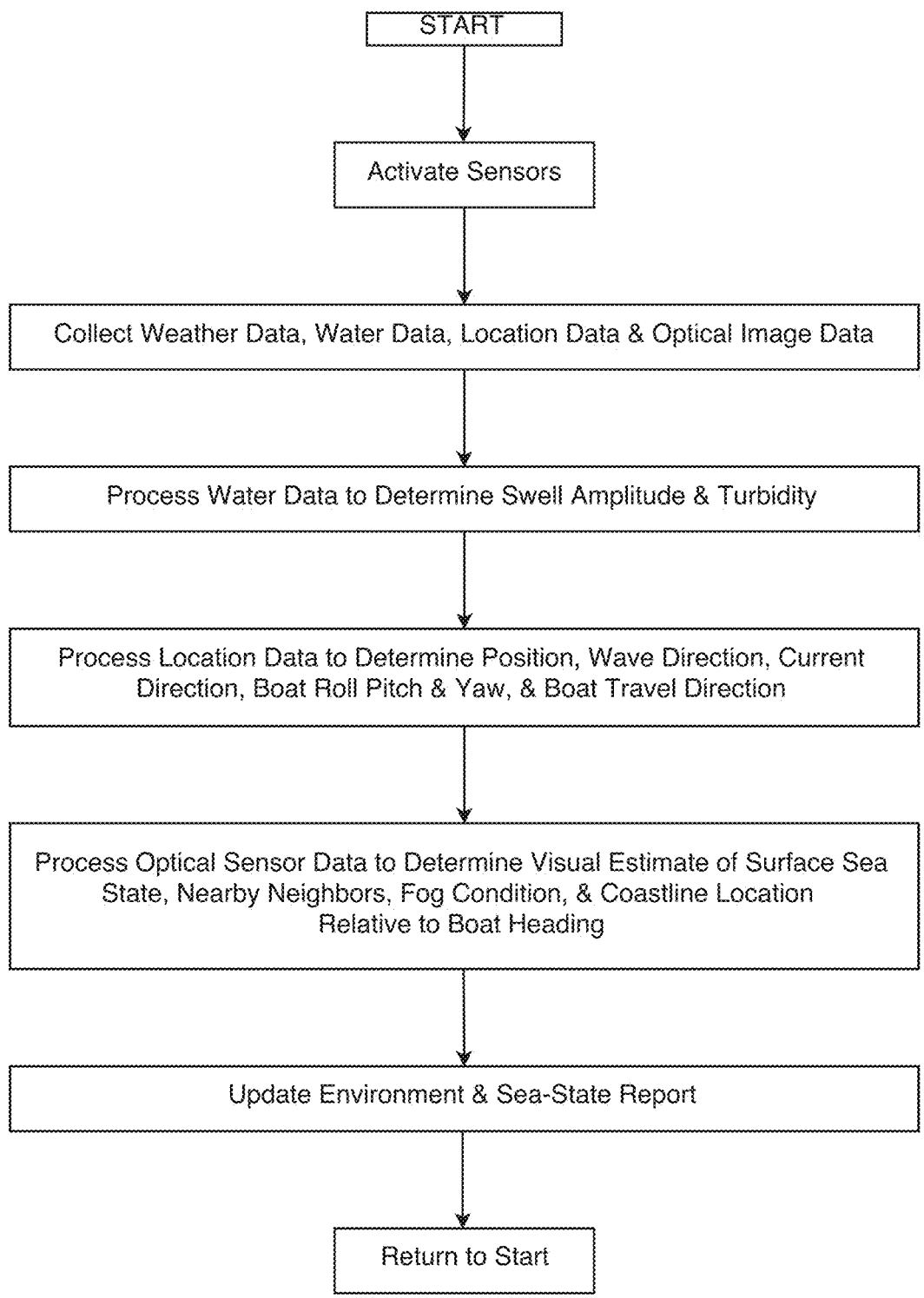
Fig. 4 Flow Chart (2) Environment Sea-State

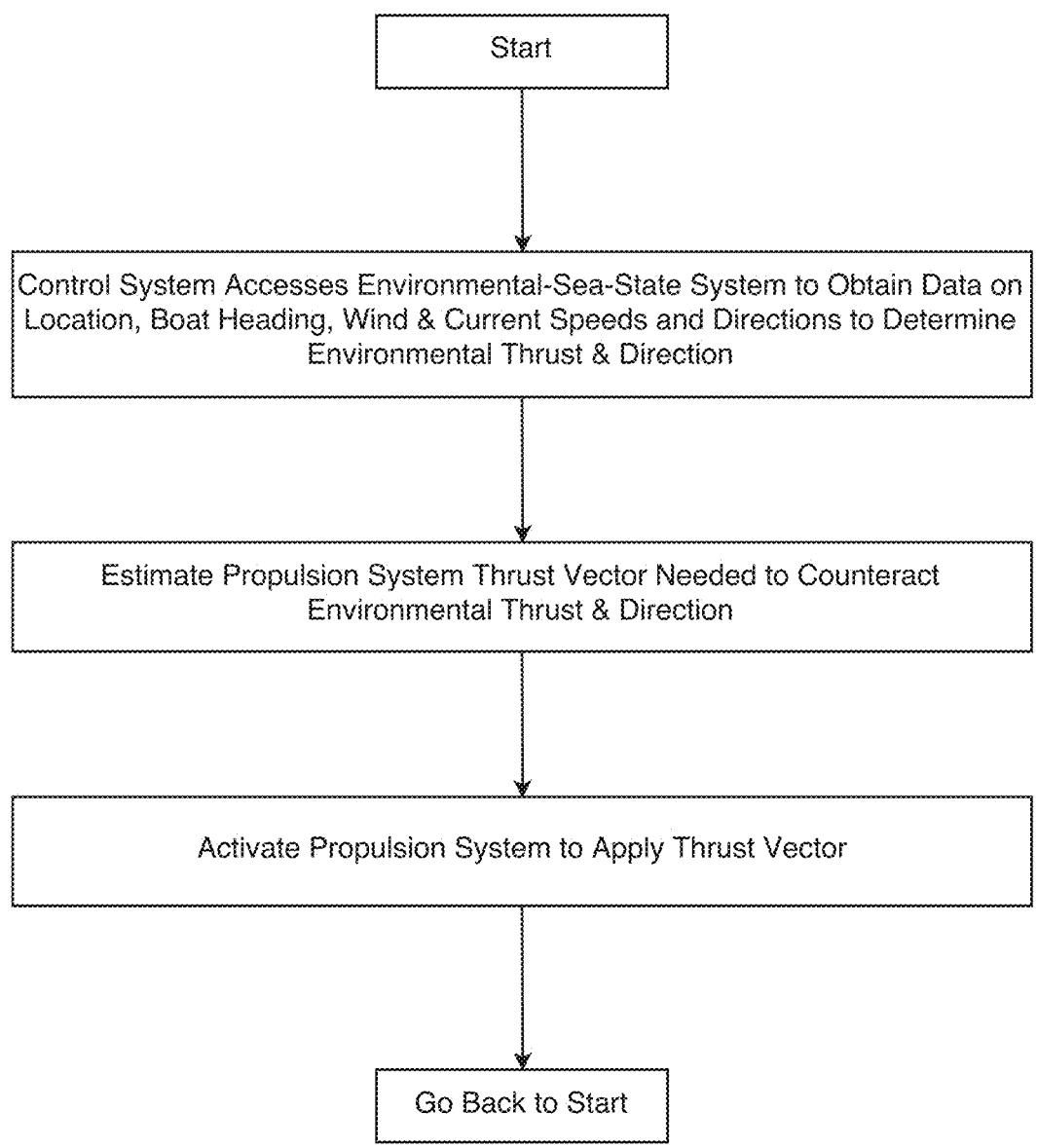
Fig. 5  Flow Chart (3) Maintain Stationary Position

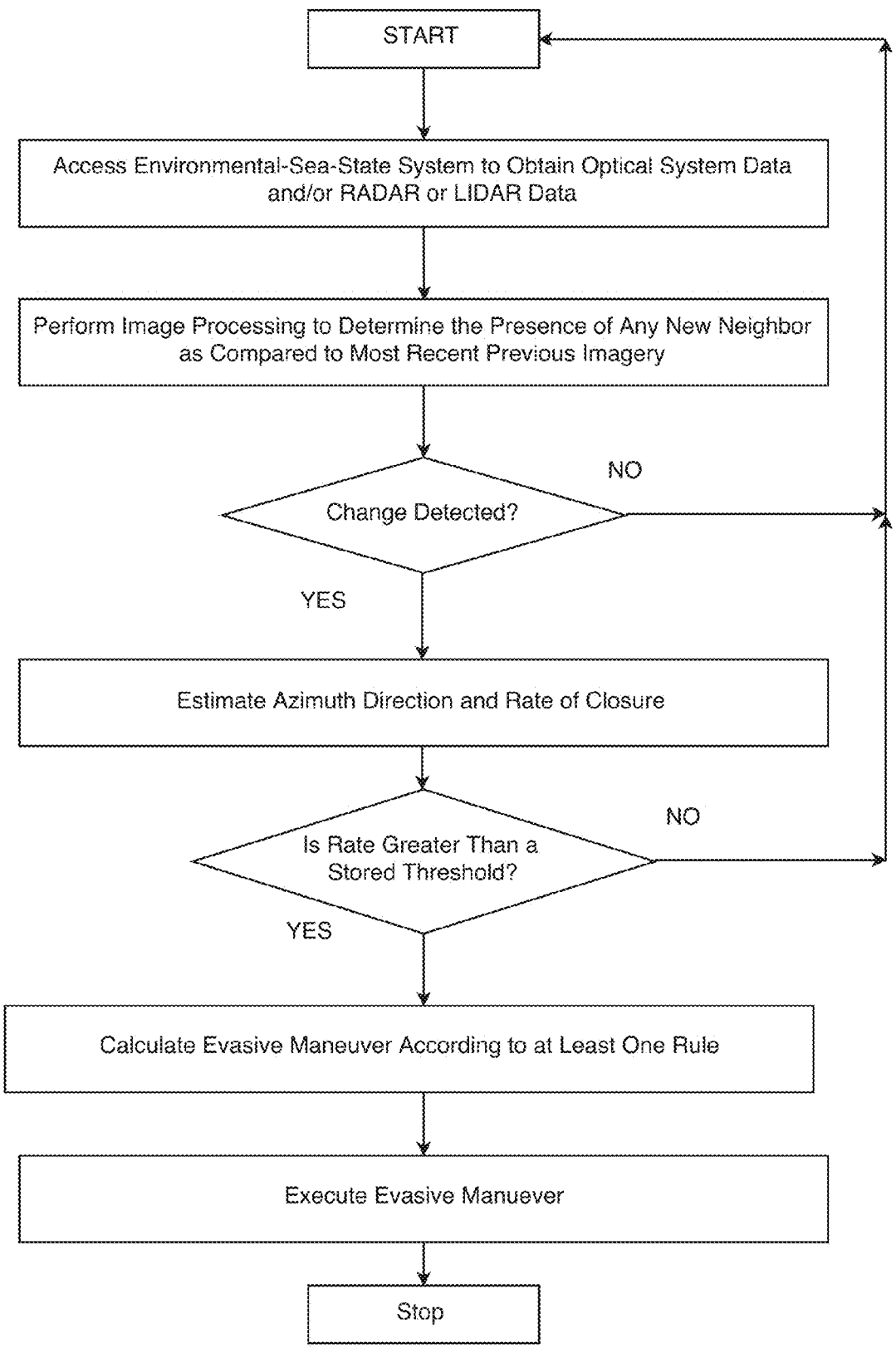
Fig. 6 Flow Chart (4) Collision Avoidance

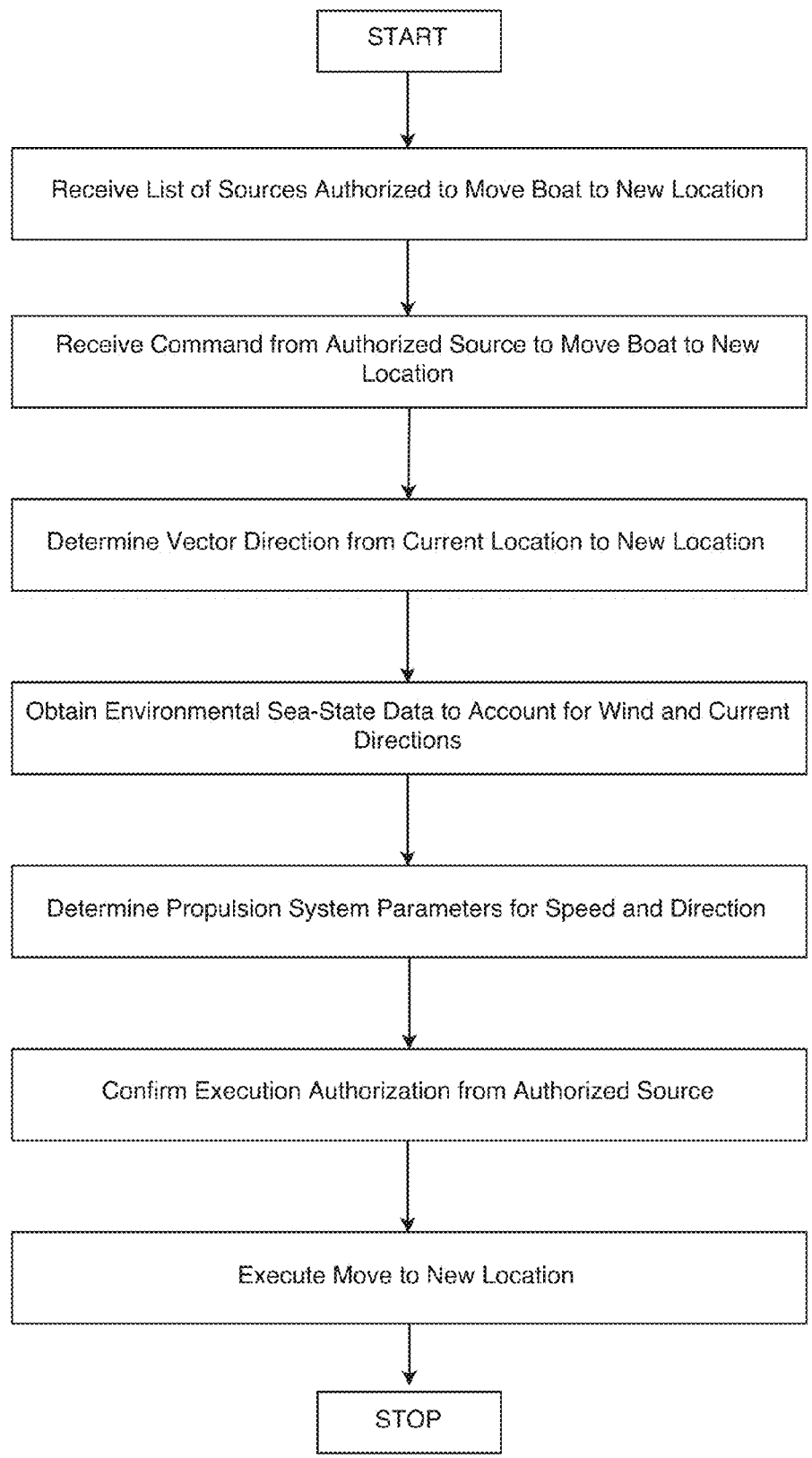
Fig. 7 Flow Chart (5) Moving to a New Location

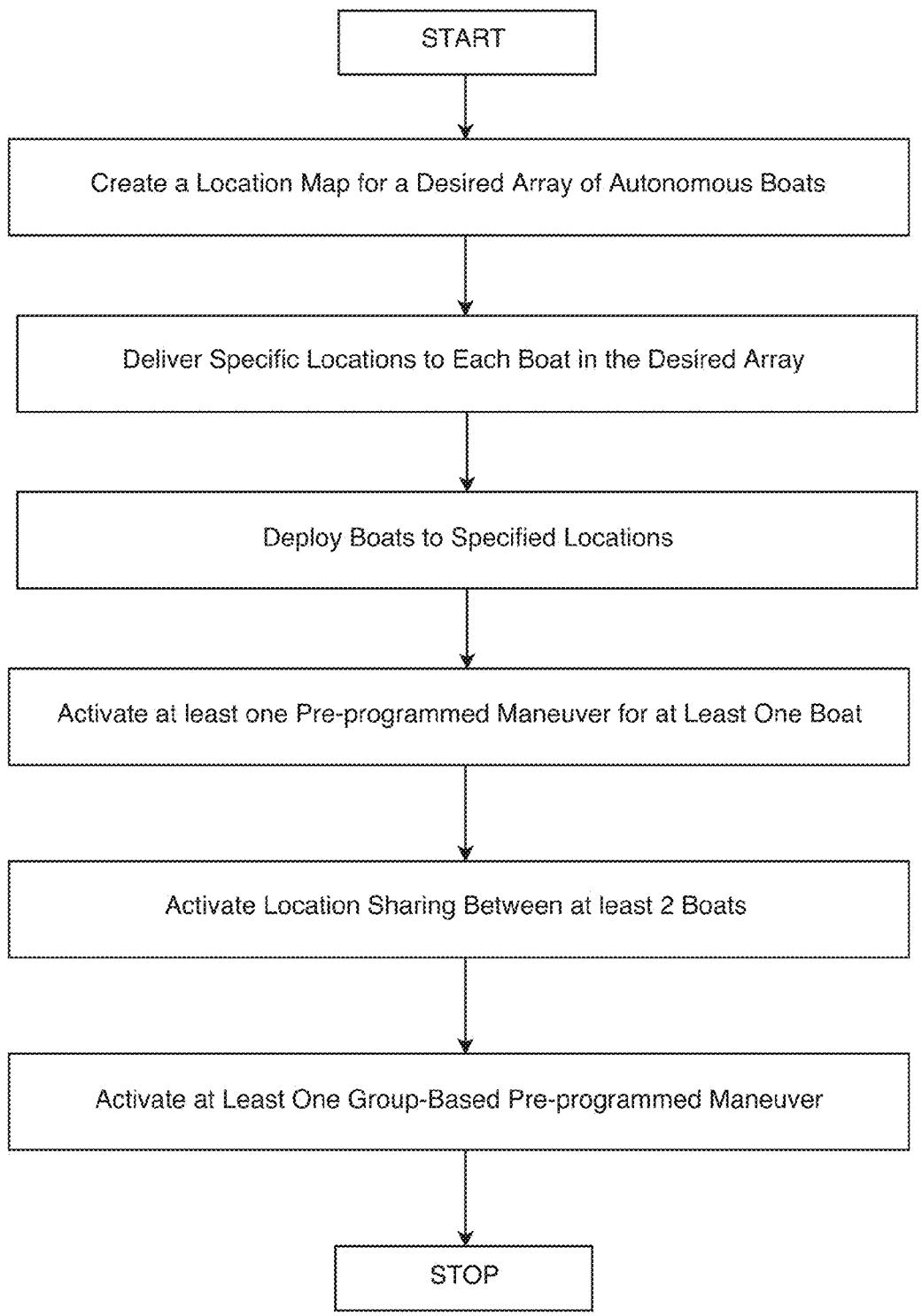
Fig. 8 Flow Chart (6) Collaboration Management

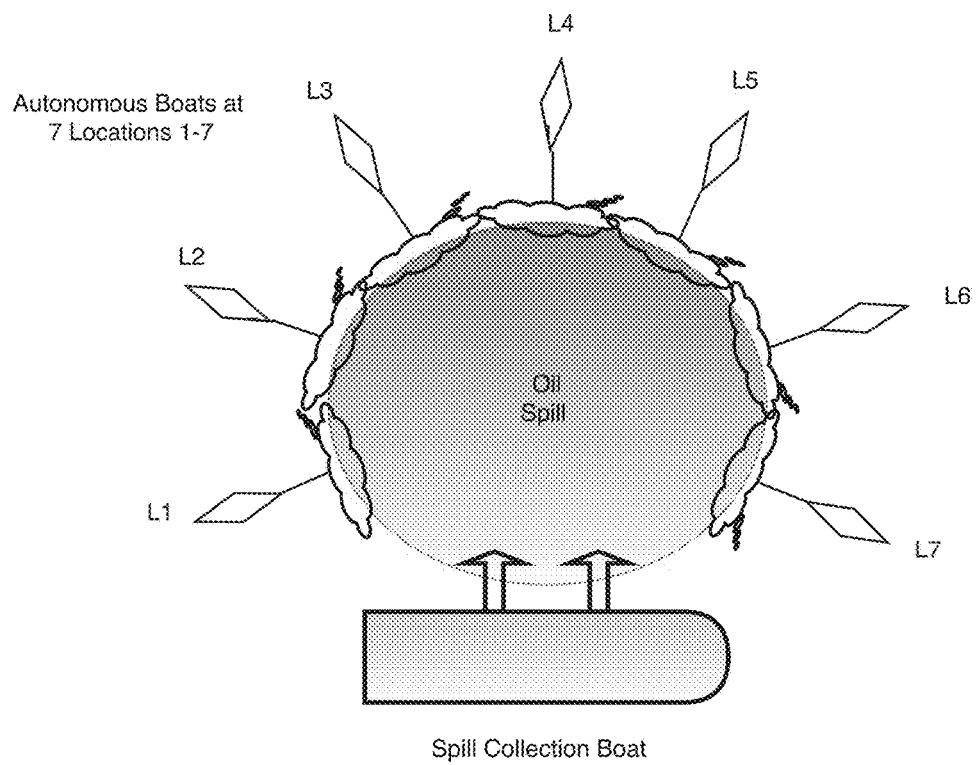
Fig. 9 Array of Boats in a Collaborative Activity
Oil Spill Containment & Collection

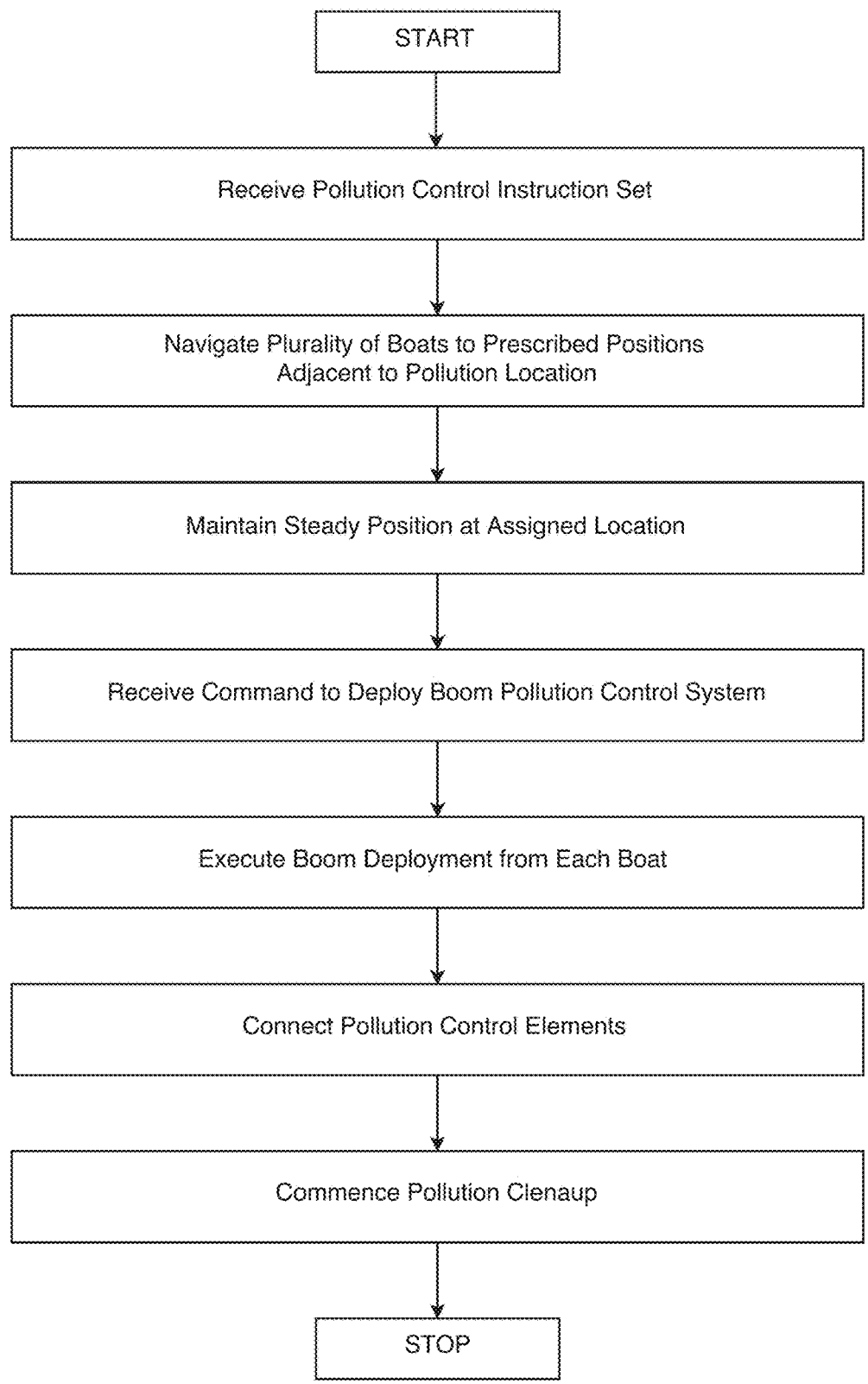
Fig. 10 Flow Chart (7) Pollution Control

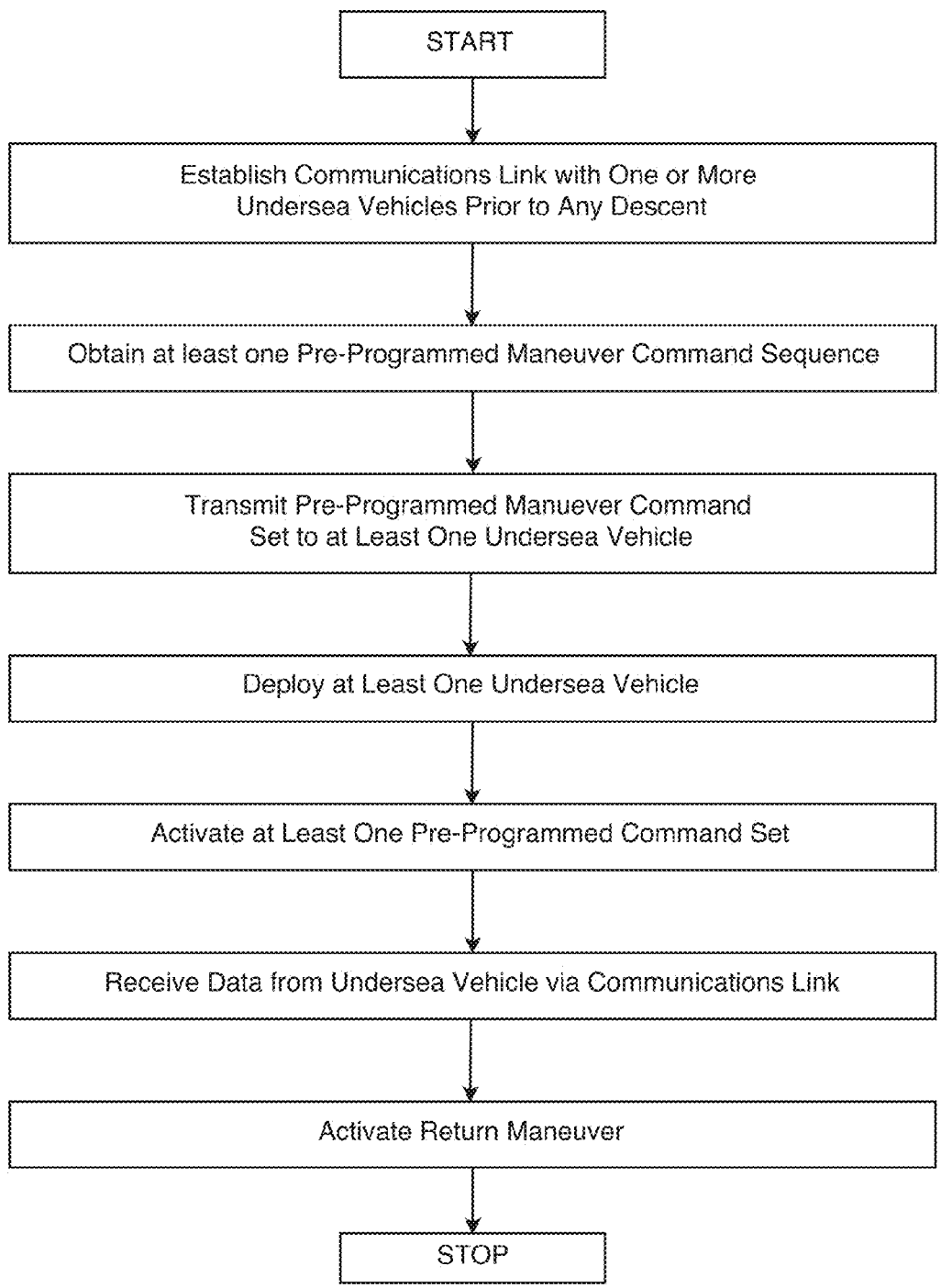
Fig. 11 Flow Chart (8) Undersea Vehicle Management

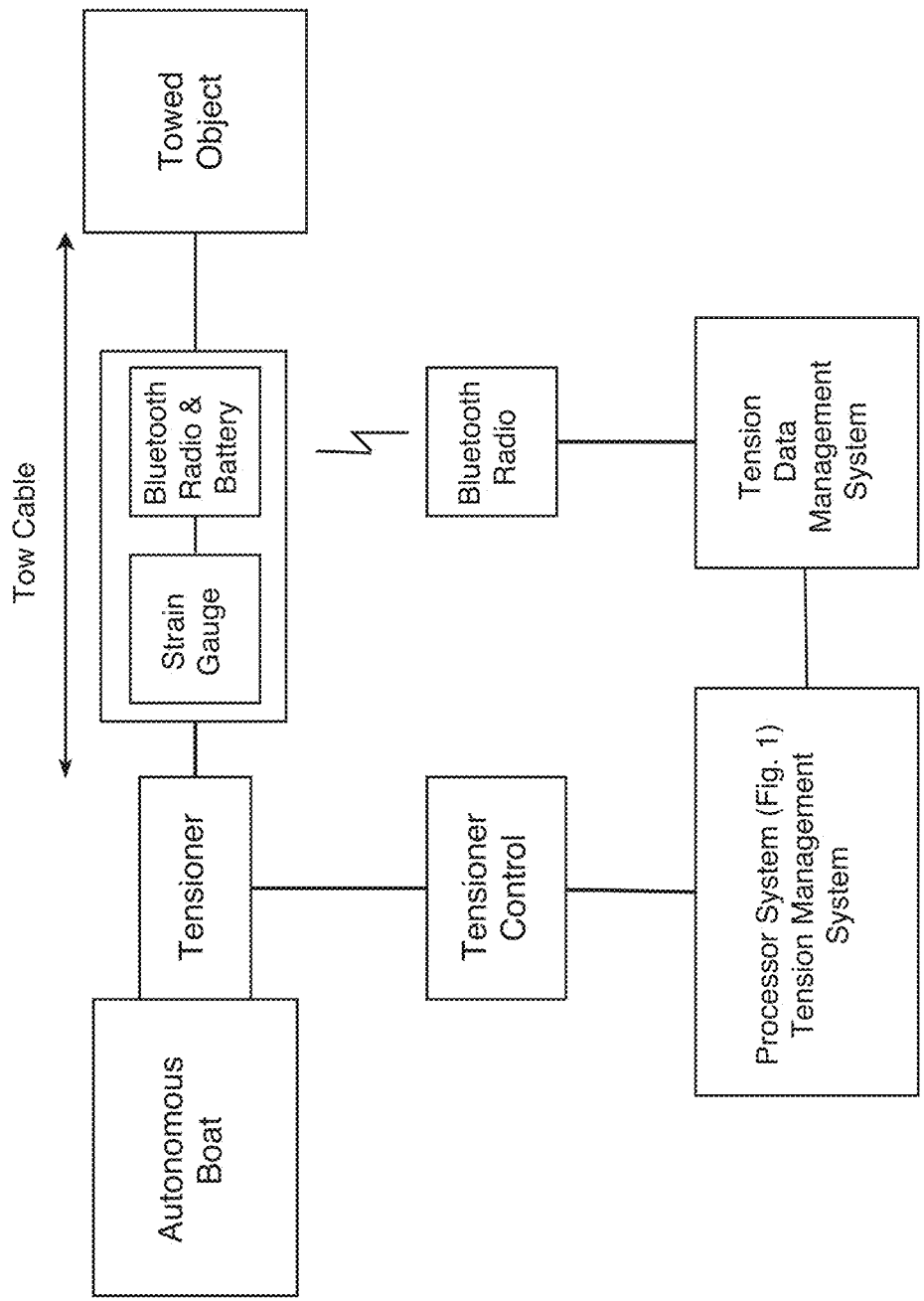
Fig. 12 Tow Cable Management System

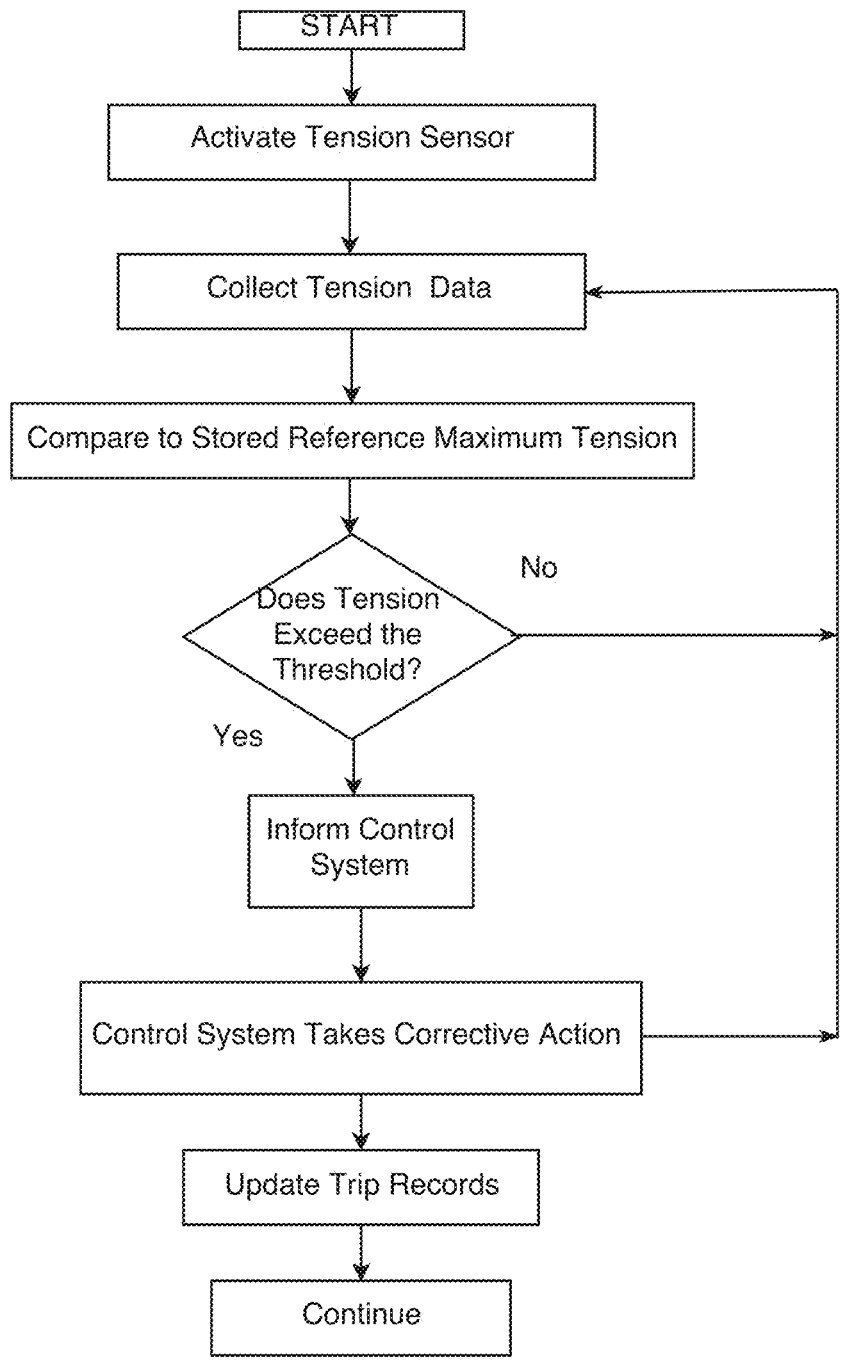
Fig. 13 Flow Chart (9) Tension Measurement & Management System

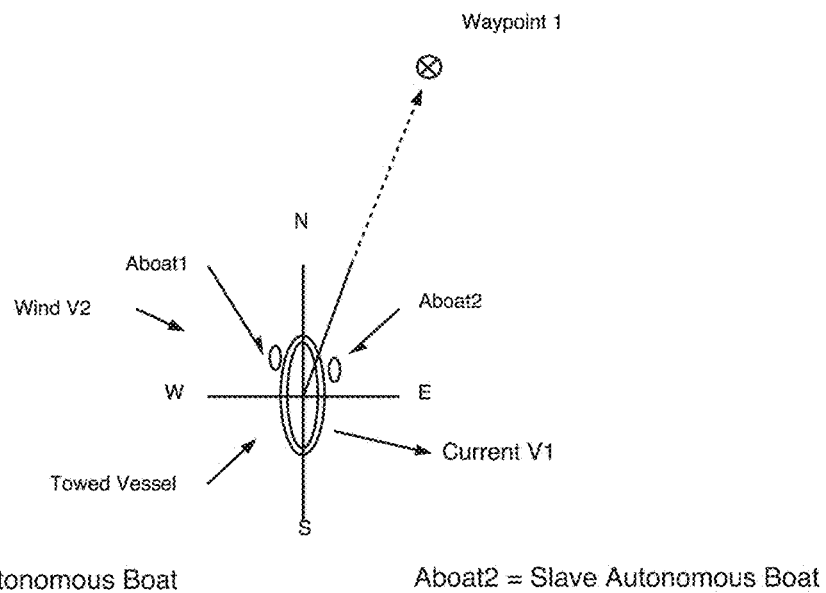
Aboat1 = Master Autonomous Boat  Aboat2 = Slave Autonomous Boat
Fig. 14A Towing Configuration
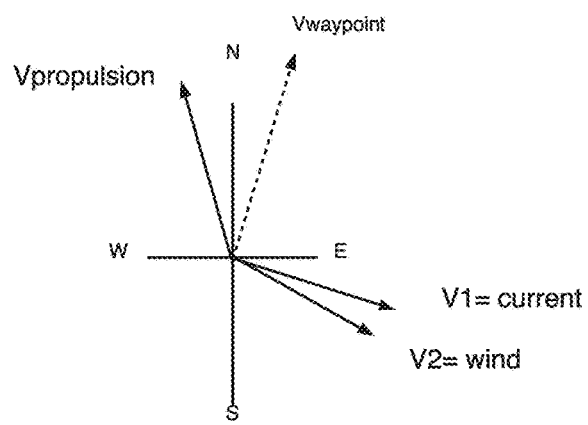
Vpropulsion + V1 + V2 = Vwaypoint
or  Vpropulsion = Vwaypoint - V1 - V2
Fig. 14B Vector Direction for Propulsion
Fig. 14A and B  Guidance Calculations

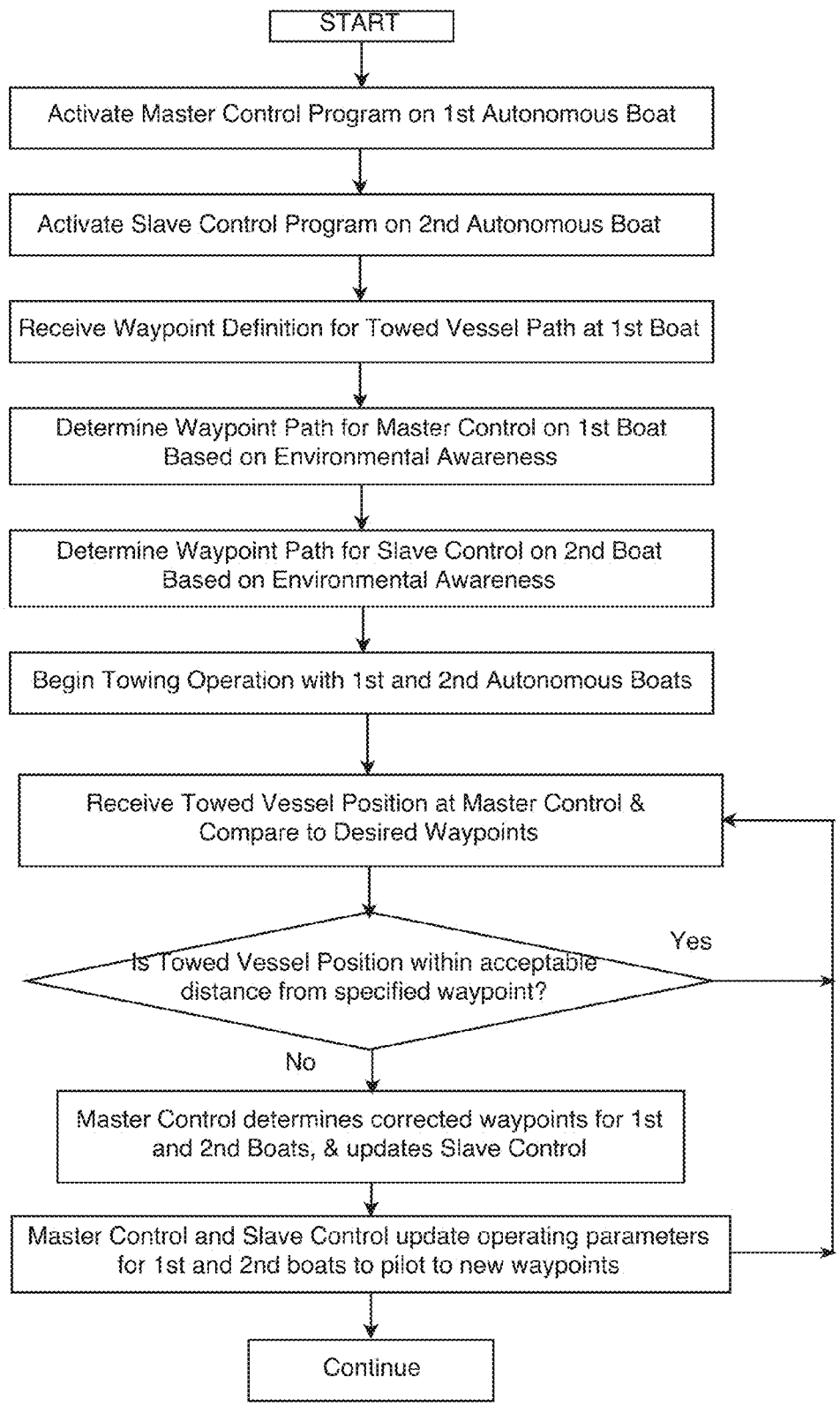
Fig. 15 Flow Chart (11) Master-Slave Towing Operation

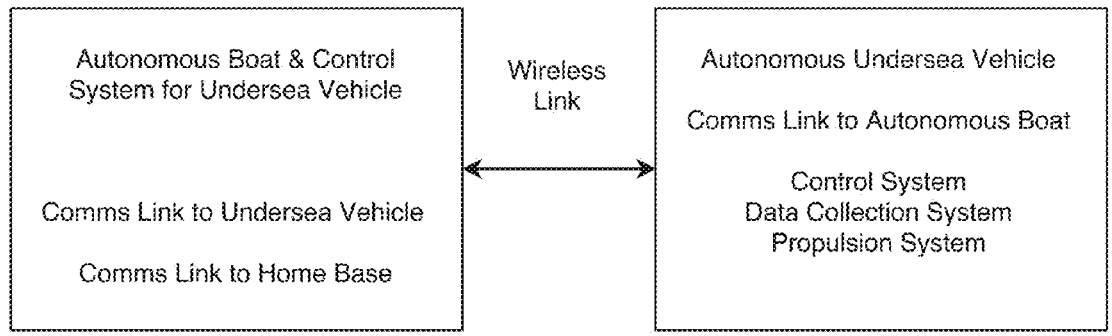
Fig. 16A Autonomous Boat & Autonomous Undersea Vehicle Block Diagram
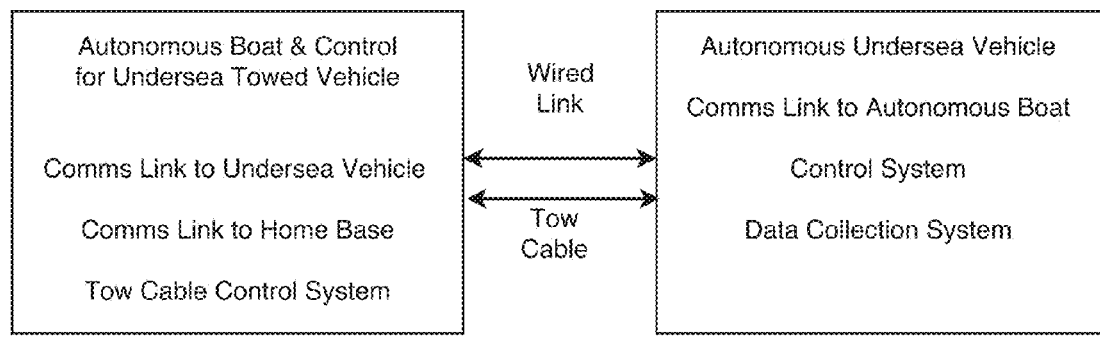
Fig. 16B Autonomous Boat & Towed Undersea Vehicle Block Diagram

AUTONOMOUS BOAT DESIGN FOR TANDEM TOWING

CROSS REFERENCE TO RELATED APPLICATIONS

This application is related to co-pending U.S. patent application Ser. No. 15/094,948, with a filing date of Apr. 8, 2016, entitled "AUTONOMOUS WORKBOATS AND METHODS OF USING SAME", the content of which is hereby incorporated by reference in its entirety herein.

FIELD OF THE INVENTION

The present invention generally relates to boats that operate autonomously or by remote control, and may be operated without on-board personnel (unmanned) or may be operated in conjunction with onboard personnel, and to methods of using such boats at sea.

BACKGROUND

Autonomous vehicles have entered the world in several embodiments, from self-driving automobiles to self-piloted drones for package delivery and reconnaissance. Various autonomous sea-going vehicles have been described as well, for use in automated data collection activities. The first sea-going autonomous vehicles were probably torpedoes, executing preprogrammed travel paths.

"Autonomous" means "no direct human intervention in the control functions." Self-contained, environmentally aware in a way that enables decent control, and sufficient processing figure out what to do next. "Partially autonomous" may also mean that the autonomous boat follows a pre-determined path supplied by a user, as best it can. Herein is described an "autonomous control boat" for use in a variety of situations where manned operation is either expensive or dangerous, or extremely difficult to manage.

In an embodiment, the autonomous or unmanned boat described herein comprises an unmanned powered marine platform that may be used to tow another in-water object or objects independently. Autonomous towing further comprises a mechanical connection between the autonomous vehicle and the towed object, which may further comprise a metal cable, wire, or tow rope or a tow line or a chain, or any other suitable linkage including rigid or semi-rigid elements. A tow cable may be part of a winch system for controlling the separation between boat and in-water object. Monitoring and controlling the tow cable is essential for proper control and towing operation, and is described further in a subsequent section.

In an embodiment, the autonomous boat may work with at least one other conventionally-piloted or autonomous boat to accomplish a tandem towing movement of one or more other in-water objects. Thus there are two different modes of operation: independent, single boat operation, and interdependent, collaborative operation with two or more boats operating in conjunction one or more in-water object.

In an embodiment, the autonomous or unmanned boat described herein comprises an autonomous powered marine platform that may be used to collaborate with another master vessel to increase the capability and productivity of an in-water operation. The autonomous vessel can be programmed to operate in a position and heading that is relative the master vessel. The autonomous vessel can collect in water, above water, or sub-bottom sea-floor data or information.

SUMMARY OF THE EMBODIMENTS OF THE INVENTION

The functionality needed for many of the operations of an autonomous boat may be summarized as "core" functions. They are:
Specialized Processors for Automated Autonomous Operation
Environmental Awareness System
Determining the Location and Orientation of the Boat
Environmental Sea-State System
Maintaining a Stationary Position
Obstacle Avoidance
Transiting to a New Location
These activities are further described in subsequent text and shown in the accompanying FIGS. 1-7.

In addition, there are several specialized activities that the autonomous boat can perform. These include:
Serving as an automated tugboat:
Managing the Towing Operation
Performing Boat Guidance and Control Functions for Towing Performing pollution control activities, including oil spill containment and abatement
Performing Collaborative Activities
Collaborative activities include working with additional conventional or autonomous boats to emulate tugboat functionality, controlling tethered and un-tethered undersea vehicles, or providing force multiplication of a mothership by expanding a survey swath. Examples are also shown in FIGS. 8-15.

BRIEF DESCRIPTION OF THE DRAWINGS

The accompanying drawings, which are incorporated in and form a part of the specification, illustrate various embodiments and, together the Description of Embodiments, serve to explain principles discussed below. The drawings referred to in this brief description of the drawings should not be understood as being drawn to scale unless specifically noted.

FIG. 1 shows a System Block Diagram for the integrated control system that controls the boat actions and activities.

FIGS. 2A and 2B show Block Diagrams for an Environmental Awareness System that takes multiple data sources into account to create an Environmental Status Report.

FIG. 3 is a flow chart (1) that describes the steps performed by the integrated control system when determining where the boat is located.

FIG. 4 is a flow chart (2) that describes the operation of the Environmental Sea-State System previously described in FIG. 2.

FIG. 5 is a flow chart (3) that describes the operation of the control system when keeping the boat in a stationary position.

FIG. 6 is a flow chart (4) that describes the operation of the control system where the operation is to avoid a possible collision with another object.

FIG. 7 is a flow chart (5) that describes the operation of the control system where the operation is to move to a new location.

FIG. 8 is a flow chart (6) that describes the operation of the control system where the operation involves the management of collaborative activities.

FIG. 9 depicts a typical collaborative activity involving an oil spill containment process.

FIG. 10 is a flow chart (7) that describes the operation of the control system where the operation is performing pollution control activities, such as shown in FIG. 9.

FIG. 11 is a flow chart (8) that describes the operation of the control system when it is performing management of an undersea vehicle.

FIG. 12 is a block diagram depicting a system for measuring and controlling tow line position and tension and providing management information.

FIG. 13 is a flow chart (9) that describes the operation of the tension monitor system.

FIGS. 14A and 14B are diagrams depicting the guidance calculations for determining a propulsion vector direction for towing a vessel to a designated waypoint.

FIG. 15 is a flow chart (10) that describes the operation of a pair of autonomous boats operating in a master-slave relationship for towing a vessel.

FIGS. 16A and 16B are block diagrams depicting an autonomous undersea vehicle being controlled by an autonomous boat via a wireless and wired link.

The figures are provided in order to present a thorough understanding of the present invention. The figures should not be construed as limiting the breadth of the invention in any manner.

SUMMARY OF EMBODIMENTS OF THE INVENTION: CORE FUNCTIONS

The essential difference between the prior art and currently described autonomous boat functions lies in the way an overall model is created for vehicle behavior of the autonomous control boat. In an embodiment of the invention, this model takes into account the behavior of the target devices that need herding and control. In an embodiment of the invention, aspects of the model are integrated with knowledge of the sea state. In an embodiment of the invention, the autopilot system is fully integrated with the sea-state data and the two devices, the boat and the target device. The big difference between what a human does by remote control and remote observation lies in the experienced processing in a human brain of the data about the 3 states: boat, target, and sea. In an embodiment of the invention, herein is created a sufficiently complete model that lets a computer do a credible job of standing in for a human. Human override in the event of some unexpected change in the three states, for example, may necessitate some kind of intervention.

In an embodiment of the invention, the heart of the autonomous control system is a vehicle controller computer (low level), guidance and task management computer (high level), data input from a combination of a set of sensors, data output to vehicle control machinery, and communication/data link to a remote user station. The overall product consists of a series of programs for each of the cited elements, and a main control program.

The location/orientation "state" of an object referred to is defined by at least 6 parameters: roll, pitch, and yaw, and x, y, and z. Roll, pitch, and yaw may be determined by a combination of a 3-axis accelerometer and a compass or magnetometer or a gyroscope. In an embodiment of the invention, well-known methods for determining orientation from at least 2 sensors are incorporated.

Position in terms of x, y, and z coordinates may be found from GPS/GNSS receivers. Determining location with GNSS/GPS anywhere on earth with accuracy better than 1 meter is commonplace today, via error correction systems. For high performance operations, various alternate positioning methods using GPS such as DGPS, RTK or RTX can provide sub-meter accuracy.

In an embodiment of the invention orientation of the autonomous boat may be determined from a variety of sensors associated with the Environmental Awareness System, including an inertial navigation system (INS), a compass (gyro or magnetic), Differential GPS (DGPS), or may be derived from a series of GPS/GNSS position measurements made over a short period of time, from which heading may be extrapolated.

In an embodiment of the invention, image sensors can be employed to indicate proximity to nearby objects including reference points on the target, other neighboring objects, buoys, potential hazards, and the like. In an embodiment of the invention, stereo pairs of imagers can provide photogrammetric-derived distances to precise locations on the target vehicle. In an embodiment of the invention, bulls-eye targets can be affixed to points of interest on the target vehicle with real-time measurements of pre-arranged distances, again, for use by the state machine and autopilot. In an embodiment of the invention, electronic distance measurements [EDMs] via laser may be used in lieu of photogrammetric methods. Such EDMs may be implemented with radar, sonar, or lidar systems.

Defining the "sea state" is a well-known requirement but is still evolving process. In an embodiment of the invention, data may be obtained from sensors external to the boat and the target object, as well as on the boat itself. Sea state can be measured when the boat is under way by motive power or not under way and is just 'floating.' Temperature, air pressure, wind speed, water depth, and wave state all enter into the instant condition estimate of the sea-state.

In an embodiment of the invention, once the various states are known and updated in real time, and a selected work flow guidance/control plan is entered into the guidance and task management computer, this computer can deliver commands to the propulsion and steering system to perform the desired movement of boat and target, while taking account of boat state, target state, and sea state.

In an embodiment of the invention, there are multiple types of navigation/control objectives, some of which are described in the figures demonstrating flow chart operations. In an embodiment of the invention, a remote setup function is invoked by a master controller [machine or person] to set the desired functions in motion according to a pre-planned sequence. Herein is described the variety of control functions needed to implement most of the tasks put forth in the provisional patent.

In an embodiment of the invention, data acquisition of a target state of location and orientation may be obtained by use of small integrated wireless position/orientation sensor (s) affixed to target, such as the Trimble® Leap product.

In an embodiment of the invention, multiple methods may be used to automatically affix a remote sensor to a target, or to affix a reference bullseye target. For example, in an embodiment of the invention, a cross bow with an arrow carrying a sensor is launched toward the target, and affixes itself to the target with a glue material on back side of the sensor. Any other suitable launch system may be used as well.

In an embodiment of the invention, photogrammetric or electronic distance measurement may be made via LIDAR or SONAR or RADAR to reference points on the target vehicle, and to nearby objects in the vicinity of the autonomous boat. For example, in an embodiment of the invention, a pair of cell phones may be used to obtain images that can be processed to determine distance and orientation of a remote target on an object.

In an embodiment of the invention, automatic maneuvering with precise alignment with a target object like another boat may be done via a pre-programmed operation. This capability is essential for fully automatic unmanned operation in order to bring the autonomous boat to a dock, or to work with another autonomous boat where both boats are operating as tugboats.

In an embodiment of the invention, a high performance propulsion system is incorporated. Additional control mechanisms for added maneuvering flexibility via 360 degree azimuth propulsion systems or more than one source of propulsion wherein one or more jets are provided. Such propulsion systems may comprise water jets with nozzles that can rotate 360 degrees about a vertical axis. The autonomous tugboat may also utilize additional auxiliary thrusters for heading or station keeping control.

Other embodiments for improved propulsion control may comprise use of a propeller system with similar rotational range of operation about a vertical axis. Such a propeller system may comprise reversible direction propellers.

In an embodiment of the invention, automatic safety overrides based on preset conditions that are compared to Environmental Awareness System data inputted to a suitable state machine [program] may determine when to activate corrective measures by the autopilot.

Embodiments of the Invention: Tugboat Operation

In an embodiment of the invention, the autonomous boat is programmed to function as a tugboat. Synchronized guidance/control of multiple autonomous tugboats can perform synchronized movement of target objects, as tugboats do. The autonomous tugboat may work collaboratively with at least one other conventionally operated boat or autonomous boat to accomplish a multi-platform task whereby each singular tugboat is towing a separate in-water object or tandem-towing one object or linked string of objects. Coordination with the towed or guided vessel and a possible second autonomous boat may be done via a pre-programmed operation involving several of the functional control elements described herein and shown in the figures. Such pre-programmed operation may require control functions that meet the needs of the overall operational goal, but are not the same as if the towed/guided vessel were operating under its own power.

Tow lines are often used to connect the autonomous tugboat to a vessel to be towed. Maintaining a controlled level of tension in the tow line is essential to completing the mission without breaking the tow line. In an embodiment of the invention, tension measurements in the tow line may be made via strain gauge sensors embedded in the tow line, and said measurements are coupled to a wireless communication system, such as that widely implemented by Bluetooth hardware and systems, form an additional input of an important condition into the autonomy computer. The data feed from a strain gauge may be used to adjust and control the propulsion and steering of the autonomous tugboat to maintain desired tension and desired direction of travel. Tension and shock data may be collected and maintained for continued evaluation of tow line stress. In the event the accumulated stress exceeds a specified threshold, an alert may be activated indicating there is a risk of failure, even at reduced tension levels.

In an embodiment of the invention, two boats may serve as a pair of operating tugboats, with one or both being autonomous. In an embodiment of the invention, a first boat is designated as the "Master" or "Mothership" and the second boat is designated as the "Slave" or "Daughter Vessel". In this configuration, the Master tugboat determines or receives a course and heading, or a series of waypoints created by a person in command of the operation, as shown in FIG. 1 where instructions from a Remote Home Base are radioed to the control system on the autonomous boat. The course and heading or waypoints define the path that the towed vessel should follow. In a second program operative at the Master, a second set of waypoints is determined for the autonomous boat to follow so that the towed vessel follows the first set of waypoints. The second set of waypoints is determined dynamically by the autonomy computer and takes account of the Environmental Awareness System inputs regarding wind, wave action, sea-state, and current flow. This towing guidance course is dynamically adjusted over short time periods, on the order of seconds to minutes, depending on the environmental conditions.

In a first aspect, the present invention relates to a method for propelling a target boat via an unmanned boat having autonomous navigation/guidance. control, and propulsion systems for moving target boat along a pre-determined guidance path for said target boat. In some embodiments, the method includes: providing a linking system for joining the target boat to the unmanned boat to enable propulsion of target boat by unmanned boat; providing a sea-state sensor system for accounting for current sea state of the environment of the target boat and the unmanned boat; providing a position/orientation sensor system for said target boat; providing a position/orientation system for said unmanned boat; providing an Autonomous Control System for accounting for sea state. orientation/position of target boat and unmanned boat, and pre-determined path, wherein Autonomous Control System determines command/control instructions for the propulsion system; and wherein said propulsion system receives commands for directing unmanned boat from autopilot system to propel target boat along the pre-determined path.

In some applications, the method may include one or more of the following: the current sea state may be determined in real time; the boat position/orientation/heading may be determined in real time; a computer-based Graphical User Interface may be used by a Remote Operator to provide high-level commands wirelessly to the Autonomous Control System on the autonomous vessel, such as waypoints, or pre-determined path. In some variations, the Autonomous Control System is further configured to receive override commands from a mother ship wirelessly.

In a second aspect, the present invention relates to a method for determining a control command/function for a propulsion system on an unmanned autonomous boat. In some embodiments, the method includes: providing an autonomous control system configured to receive position and orientation information for said unmanned autonomous boat; providing sea-state data, vessel motions and acceleration values, and wind data for the environment of the unmanned autonomous boat for input to the guidance and navigation system; providing a navigation route and speed data for guiding the autonomous boat to a selected designation to the guidance and navigation system at a pre-determined velocity: providing an override control input to the autonomous control system for altering the navigation route/speed via a remote input; providing an algorithm [in a real time filtering system] in the autopilot system to integrate the sea-state data, the position/orientation data, the navigation route and speed data, and the override control data to determine a propulsion control signal for the propulsion system and steering control signal for the steering control system.

DETAILED DESCRIPTION OF THE INVENTION

FIG. 1 depicts the fully integrated control system and environmental awareness system in a block diagram. A computing processor system contains the essential elements: Hardware memory, Random Access Memory [RAM], Read Only Memory [ROM], the processor/CPU, an Input/Output port, and software modules that provide an operating system, with a variety of applications.

Attached to the Processing System are a number of devices. A Peripheral Readable Storage Medium is typically located external to the Processor System, and may be implemented via a rotating medium hard drive or another RAM such as may be found implemented in memory sticks as an EPROM.

A Remote Home Base block represents the remotely located control center which contains a variety of data management systems, processors, and a radio link for communicating with the autonomous boat's control system. The Remote Home Base is equipped to formulate and send commands, and to receive status reports from the Processing System. It may be manned or unmanned.

Programs and commands may be sent directly to the Processing System via the radio relay link, from the Remote Home Base to the corresponding radio receiver/transmitter system on the autonomous boat, as shown in the box labeled "Radio Link On Board." The Operating System of the Processor System is configured to receive pre-programmed instruction data packages, store them, and access them according a set of instructions associated with the Operating System. Alternatively, the pre-programmed instructions may also include start-up instructions for executing the remainder of the instruction set in the pre-programmed data package.

The autonomous boat control system is configured to operate in any of three modes: Remote Control, Manual Local Control, or Automatic Control.

If the boat is unmanned, then the Remote Home Base has priority for controlling the processor operation, under Remote Control. The Remote Home Base an initiate a series of pre-programmed operations. Typically such operations involve feedback from the Processing System regarding the status of any such operation, enabling the Remote Home Base to abort any operation according to pre-arranged rules, and begin a new operation as may be selected by Management at the Remote Home Base.

Alternatively, in an embodiment, a person may take control of the autonomous boat via a command to the Mode Select function. Such local control may enable continued autonomous operation, or manually inputted command operation.

To that end, there is a display connected to the Processing System bus to enable local observability of all control functions, including status of the sea state as determined by the Environmental Awareness System, shown as an attached functional block to the Processing System.

In an embodiment, the Processing System is integrated with an External Tool Control module, for use in activating and operating external tools such as oil collection booms. Other such automated tool management systems may be similarly implemented. Elements of this module may require individual customization to suit the needs of the specific tool.

In an embodiment, the Processing System is connected to the Propulsion System for activation and control of the Propulsion System.

The following descriptions of embodiments of the invention address the subsequent figures after FIG. 1.

2. FIGS. 2A and 2B Environmental Awareness System

FIG. 2A depicts a block diagram of an Environmental Awareness System [EWA]. The components of the Sea-State System comprise a computer processing system for executing a series of algorithms and commands and a Sensor Communications System for obtaining environmental sensing data from a variety of sensors subsystems. The sensor subsystems further comprise a Weather system, a Water System, and Location System, and an Optical Sensor system. An integral part of the Environmental Awareness System [EWA] is a group of sensors for estimating the sea-state.

In an embodiment, the Weather subsystem measures air temperature, wind speed, and wind direction, and provides this data to the Sensor Communication System. The Weather system measures precipitation and provides it to the Sensor Communications system.

In an embodiment, the Water system measures water temperature, turbidity, wave action from a local inertial navigation system data, water current speed and direction of current flow, and provides this information to the Sensor Communications system. Wave action may be determined from INS data by reading the vertical excursion delta Y of the INS system from the x, y, and z coordinate displacements over a given time period.

In an embodiment, additional information may be provided by an optional inertial navigation system. Both the GNSS/GPS and the INS system can provide data covering the direction of travel path followed by the autonomous boat from the time it leaves a mooring until its return.

The omnidirectional camera and the directed camera were described previously. The cameras are monitored, controlled and their data is processed by the computer processing system.

The data generated by the computer processing system are contained in the Environmental Report. In an embodiment, the data comprises Weather Data, Location information, Direction of Travel, Drift and Current speed, water temperature, turbidity [water clarity], an estimate of the Sea State, the presence of any nearby objects, and any potential collision status.

In an embodiment, the Sea State information comprises wave height [distance from wave trough to crest], wave period, wave-length, wave steepness [the ratio of wave height to the wave-length], wave speed, time between crests passing a point, and overall power spectrum. This data may be derived from the INS system. Sea State is also defined by the Beaufort number, which takes wind speed, waveform and height into account.

In FIG. 2B, a flow chart for determining the Sea State is depicted. The steps comprise collecting data from the sensors, evaluating the data according the predetermined metrics, processing the data to obtain appropriate metrics, and comparing the data to standard Sea State reference data to determine a Sea State metric.

3. FIG. 3 Flow Chart 1 Where Am I?

Flow Chart 1 depicts the steps for determining and updating a position fix for the autonomous boat.

The autonomous boat has at least one of a GNSS/GPS or DGPS receiver, radio beacon system, fan-beam laser target system, and optionally may have an omni-directional camera for assessing the sea-state and physical environment.

The operating system used to implement the "Where am I?" functionality starts at step one where is it determines whether GPS GNSS is available. If GPS/G NSS is available, it obtains a position fix and it delivers it to the Sea-state system. This operation is repeated on a continuous subsecond basis until the system is turned off.

In the event that the DGPS or GPS/GNSS positioning systems are not available, the Autonomy Computer sends an alarm to the Remote Operator Station and reverts to an automated Dead Reckoning System that reviews the speed and drift data from before the real time positioning system became unavailable and uses the information to calculate and estimate the continuing course of the vessel. The Autonomy Computer will immediately revert back to DGPS or GPS/GNSS when available and make any necessary vehicle corrections.

In an embodiment, a camera can be used for vehicle positioning which may be conventional cameras or an omni-directional unit configured to have a 360 degree horizontal and vertical field of view Images captured are sent to a processing system for comparison with stored images of the coastline in the region of interest. If a match is found with a stored image, the location may be determined by taking additional images at different locations, wherein photogrammetric mage processing methods can determine a location of the autonomous boat.

In an embodiment, images taken by the omni-directional camera may be used to determine horizontal orientation of the autonomous boat by pattern matching of coastline images. This could be important if the autonomous boat is not able to move. If the boat can move, then orientation may also be found from sequential GPS/GNSS position fixes taken at different locations.

In an embodiment, an alternate camera may be employed in which the camera has non-omni-directional field of view with a variable focal length lens. In an embodiment, this camera may be remotely controlled to aim in a desired direction. In an embodiment, this camera may be remotely controlled to adjust the focal length to obtain a zoomed-in image.

In an embodiment, any of these two types of cameras may obtain images that can be analyzed by the image processing system resident as a set of algorithms available to the computer processing system, to determine fog conditions and infer visibility.

In an embodiment, camera or video data and even 360-degree images or video is passed or streamed from the vessel in real time to a Remote Operator Station so that a person can pilot the boat remotely. The 360-degree video or images can be displayed on desk top, wall mounted, or tablet screens or be viewed on virtual reality (VR) goggles or glasses that are worn by an operator and use local referencing to see any part of the 360-degree video or image by movement of the goggles or glasses.

4. FIG. 4 Environmental Sea-State System

In FIG. 4, The Sea State system operation starts and activates the sensors. The next step is to collect data from the activated sensors, including weather data, water data, location data and optical image data.

The next step describes processing the water data to determine swell/wave amplitude and water turbidity. The next step describes processing the location data, water data, INS data, and weather data to determine wave position, wave direction, current direction, boat travel direction, and amplitude of boat motion in terms of roll, pitch and yaw.

The next step describes processing the optical image data from the camera[s] to determine a visual estimate of the surface of the sea, any nearby neighbors, any fog condition, and coastline location relative to boat location and orientation or heading. The next step shows that the computer processing system updates the Environment and Sea-State report.

5. FIG. 5 Flow Chart for Maintaining a Stationary Position

FIG. 5 depicts a Flow Chart for a standard operation called Maintain Stationary Position. The goal of this operation is keep the autonomous boat in a stationary position and a constant heading direction. "Stationary" is relative to a reference position determined by the Location system, and chosen by a pre-programmed operation implemented in the Computer Processing system. Upon receipt of a command to initiate Maintain Stationary Position, the first step in the operation commands the control element of the computer processing system to access the Environmental Sea-State system to obtain data on the location, heading, wind speed and direction, current speed and direction. In the next step, the computer processing system determines a net vector direction that would be moving the boat if it were not operating any propulsion system. The control system determines the opposite direction and magnitude of thrust for the propulsion system to exactly counteract the net external direction of the various external forces acting on the autonomous boat. The control system has a set of data that relates likely boat motion to the magnitude and direction of forces from wind and current and wave action. In the next step, the control system activates the propulsion system to apply a thrust vector to maintain a constant position. In an embodiment, this thrust vector is updated second by second. In an embodiment, the update rate may be altered to suit the application, and may be faster or slower than once per second. In an embodiment, the thrust vector may be operated in a pulsed mode or a continuous mode.

6. FIG. 6 Obstacle Avoidance Maneuver

FIG. 6 depicts a flow chart for implementing a collision avoidance maneuver. The control algorithms for collision avoidance start by accessing the Environmental-Sea-State System to obtain optical system data and optionally RADAR data, or optionally an LIDAR data. LIDAR refers to optical signal measurements of distance and bearing, like RADAR, but at light frequencies, or wavelengths. The first operation compares instant optical imagery to previous optical images to check to see if there are any nearby neighboring craft. This test is done continuously on new imagery captured on a periodic basis. The time frame may be as often as once a second, or faster, but may also be slower, such as once every 10-30 seconds. If a change in the imagery occurs, the next step in the operation is to increase the rate of image capture. The collision avoidance system next determines the direction of travel of the oncoming object, and then determines a rate of closure. If the direction of travel appears to be toward the boat, within a specified range of vector direction of approach, the next algorithm operates to determine an evasive maneuver direction and speed. The next algorithm estimates the time to collision based on estimating the speed of closure from a series of images, or based on radar data, and calculates the best evasive maneuver. When the rate of closure exceeds a specified speed limit, the collision avoidance system activates the evasive maneuver immediately.

7. FIG. 7 Flow Chart for Moving to a New Location

FIG. 7 depicts the steps for moving the autonomous boat to a new location.

The first step for the control algorithms in this operation is obtain and receive a list of sources which are authorized to command the boat to move to a new location. This step may include encryption and decryption of authorized source identification to prevent unauthorized agents from highjacking the boat. Additionally there may be more authentication activities. This list of authorized sources may be updated according to a prescribed rule, such as once an hour, or once a day, or any other rate, as may be preferred by the remote operator.

The next step is to receive and accept a command from an authorized source to move to a new location, specified by position coordinates such as latitude and longitude, or any other desired coordinate system.

In the next step, the control system determines the vector direction from the boat's current location to the specified destination. In the next step, the control system obtains data from the Environmental Sea-State system to account for wind and current direction and strength. The control system calculates a thrust vector for the propulsion system, taking the environmental conditions into account, and the desired arrival time, if specified in the authorized "Move to" instructions. The control system specifies a command for the propulsion system. In the next step, the control system confirms to the remote authorization source that it will execute the propulsion system command. Depending on the original message setup from the authorized source, the command may be executed directly by the control system without needing a confirmation from the remote source. Upon arrival at the specified destination, the control system may inform the remote authorizing source that the boat has arrived and is on station.

8. FIG. 8 Flow Chart Collaboration Management

FIG. 8 depicts a flow chart describing the steps to be taken when entering into an operation in conjunction with at least one other autonomous boat.

The first step as shown in FIG. 8 defines the creation of a location map for the array of boats that will participate in the joint operation. A typical kind of operation is the deployment of booms with netting to interdict an oil spill by surrounding the oil spill with boats and their netting. An Operational Management activity, optionally located remote from the complement of autonomous boats participating in the collaboration activity, defines the location for each boat, and creates a Move-To command for each boat, so that each boat takes a position at the designated location. In the next step, the Operational Management activity delivers the map of all locations and a specific command to Move-To a specified location for each boat participating. Optionally, the Operational Management activity may request confirmation from each boat regarding how each boat knows the desired location and has a Move-To command to implement the propulsion command to go to the new location in the collaboration activity. In the next step, the Operational Management activity issues a command to deploy the complement of boats, which then commence moving to the desired locations. When each boat arrives at its specified location, it sends a message to the Operational Management activity indicating it is "on station." Once all the boats are on station at the specified locations and in the proper orientation as specified by the Move-To command to each boat, the complement of boats is ready to commence a specified maneuver. For the case where the specified maneuver is to contain an oil spill, an example of an operation activates the deployment of an oil spill boom system, which results in a boom being extended from the autonomous boat, releasing a confinement netting, spreading it out so that the netting systems from each boat extend from each boom on each boat and form a closed circular oil spill fence. An oil collection boat may be stationed nearby to aid in the collection of oil from the spill.

9. FIG. 9 Collaborative Activity

FIG. 9 depicts an example of collaborative activity involving an oil spill containment activity. Seven autonomous boats are positioned so they surround a portion of an oil spill. A spill collection boat frames the remainder of the oil spill.

10. FIG. 10 Flow Chart for Pollution Management

FIG. 10 is a flow chart for a typical pollution control operation at sea. The autonomous boat fleet receives a series of data and commands wherein a list of estimated locations is provided as to where each boat in the fleet is to navigate, take up a position and maintain it, and to orient itself in a specified direction. In this type of operation, there are commands for reporting current location, orientation, and status. Camera imagery from the Environmental Awareness System is essential to proving that the fleet of autonomous boats are in the right location and the in the right orientation. Once the proper location and orientation for each boat is proven, the deployment of the collection system booms commences. Again, camera imagery may provide both confirmations of proper operation as well as mid-course guidance updates regarding boom and containment operation.

11. FIG. 11 is a flow chart describing the steps taken to operate an undersea vehicle. Typically this operation is designed to obtain measurement data from the sea floor, or for other types of information gathering. In an embodiment, a first mode of operation for the undersea vehicle is fully autonomous. In an embodiment, the autonomous boat has a wireless communications link to the undersea vehicle. In an embodiment, a second mode of operation comprises a cable connection between the autonomous boat and the undersea vehicle, whereby the autonomous boat may tow the undersea vehicle according to a preplanned path. In an embodiment, the towing cable may also comprise a direct, wired communications link to the undersea vehicle.

In either of the two modes of operation, a first step is to test and prove that a communications link is operative between the autonomous boat and the undersea vehicle. The next step is to obtain a set of instructions for the undersea vehicle. These instructions may be radioed from the Home Base or obtained from a non-volatile memory device like a memory stick provided to the autonomous boat before it leaves port. Once the set of instructions is downloaded to the undersea vehicle, additional operational checks are performed to assure proper operation of the undersea vehicle. The set of commands may include instructions for diving to specified depth levels, or to the sea floor, and collect data at various stages of the undersea operation. Depending on the connection between the undersea vehicle and the autonomous boat, the data may be relayed back in real time, or uploaded to the autonomous boat control system upon returning to the autonomous boat.

In an embodiment, the undersea vehicle may comprise a survey tow fish or a camera sled for capturing images of points of interest. In an embodiment, other sensors may be employed to collect data of a specific nature, such oil content or other minerals. In an embodiment, the towed device may need to maintain a specific distance from the sea floor. This depth control function may be implemented by monitoring the sea-floor depth and the in-water speed. In an embodiment, when the undersea vehicle is being towed, the tow cable payout length may be controlled by a suitable control system as an aid to manage the depth control operation. In an embodiment, the towed undersea vehicle may comprise at least one depth measurement device to determine the towed undersea vehicle height above the sea floor. In an embodiment, this depth measurement may be used by a depth control system in the undersea vehicle to directly control height above the sea floor, via the undersea vehicle propulsion control system.

In an embodiment, the location of a towed object relative to the autonomous boat may be determined by elements of the Environmental Sea-State System, including the image capture system. In an embodiment, a GPS/GNSS receiver system may be located on the towed object, and the GPS/GNSS location data may be radioed to the autonomous boat control system via a suitable radio link, such as a Bluetooth short-range system.

In an embodiment, location information and operational status information may be collected by the Processor System, formatted and packaged for data transmission to a Remote Home Base, as shown in FIG. 16A, 16B and in FIG. 1.

12. FIG. 12 Tow Cable Tension Monitoring System

FIG. 12 depicts a block diagram for a tow cable tension monitoring system. The cable tension is measured by a strain gauge that is embedded or otherwise attached to the tow cable in a manner that determines the tension level of the tow rope. The strain gauge is connected to a Bluetooth short-distance radio relay system that transmits strain data to a monitoring system which is connected to the autonomous boat's control system, as shown in FIG. 1. In an embodiment, the monitoring system may have stored reference data for acceptable tension limits for a variety of tow cables. In an embodiment, a manager of the autonomous boat may input a limit for a given application and a particular tow cable being used.

13. FIG. 13 Flow Chart for Tow Cable Management System

Once a tension limit is set in the tension measurement system as shown in FIG. 12, the tension system is ready to operate. FIG. 13 depicts the steps in performing a real-time monitoring function of tow cable tension. The strain gauge local tension measurement system is powered on. In an embodiment, the local measurement system may be battery-operated, or powered by boat power via a power cable. In an embodiment, the strain gauge measurement sensor may monitor the tension continuously, or it may do the measurement periodically, on a sampled time basis. The instant measurement of tension is compared to a stored reference tension. If the tension in the tow cable exceeds the specified tension limit, a signal indicative of the tension value is created and sent to the control system of FIG. 1. The control system may make an adjustment to the propulsion system to reduce the speed of the boat, or it may reduce the tension by adjusting a winch to lengthen the tow cable ["pay out the cable".] Real time feedback regarding the amount of tension in the tow cable may be used to adjust the autonomous boat propulsion thrust level to reduce speed and therefore reduce tension, and minimize the effects of sudden shocks. The real time feedback may be relayed to Home Base for monitoring or for remote control adjustment of thrust and therefore speed.

14. FIGS. 14A and 14B Guidance Calculations

FIG. 14A displays a representation of an autonomous towing operation wherein two autonomous boats Aboat1 and Aboat2, are towing a larger vessel. The tow cables are not shown in this figure but are attached to the front end of the towed vessel at typical connection points, and at the rear end of the autonomous boats. A calculation must be made to determine the direction of propulsion for the Master Aboat1 and the Slave Aboat2. The desired direction is shown at the circle-X at Waypoint 1, at some distance in front of the towed vessel. This Waypoint is a location in a suitable coordinate system such as Northing and Easting, or X and Y on map grid, or in latitude and longitude coordinates. Thus each vector has two components, Vx and Vy.

With a known location of the towed vessel, as determined by a GNSS/GPS receiver, or any other location system for the towed vessel, the vector from vessel to Waypoint1 may be determined by geometric calculations well known in the navigation arts.

There are at least two other forces acting on the towed vessel and the two autonomous boats: wind and current. Vector directions representing these two forces are shown in FIG. 14A as Current V1 and Wind V2. The effective current velocity V1 [speed and direction] is difficult to determine, but can be estimated by a number of measurement devices which are available to perform the measurement directly while on the boat. The pygmy meter, the flow probe, and the current meter can be adapted for use on an autonomous boat [see Wikipedia for information on "how to measure stream flow rate"].

The wind speed may be obtained from the Environmental Awareness System. The effect of the wind speed on the autonomous boats and the towed vessel must be calculated. The calculation requires knowledge of the effective wind load cross section of the various vessels as a function of wind direction [angle of arrival]. The effective wind load is a parameter associated with the vessel being towed, and is an input to the system calculating effective speed the towed vessel would experience when the wind blows at it from any given direction. That effective speed is what is used in the following calculations.

The combination of wind and current composite vector direction may also be determined by examining the direction of the propulsion system and its speed when the control system is operating the propulsion system to maintain a steady fixed location. The thrust level needed to maintain a given position corresponds to an open-water boat speed, which can be obtained by calibration of the boat operation in a closed channel where there is little wind and no current flow. The direction is the opposite to the direction of the propulsion system thrust.

The vectors for the desired direction of travel, Vwaypoint, the current V1, and the wind V2 are shown in FIG. 14B, along with the propulsion vector Vpropulsion. The combination of V1, V2, and Vpropulsion must combine to move the towed vessel along the vector direction of Vwaypoint:

1. $V1 + V2 + V\text{propulsion} = V\text{waypoint}$.

Rearranging the terms:

1. $V\text{propulsion} = V\text{waypoint} - V1 - V2$.

For example: let V1=2 mph at 110 deg [from North, or 20 degrees SE

1. $V2$=10 mph at 130 deg [40 degrees SE]

Let Vwaypoint=10 mph at 30 deg.
The speed components are:

$V1x = 2*\cos 20 = 2*0.94 = 1.88$ $V1y = -2*\sin 20 = 2*0.34 = -0.68$ $V2x = 10*\cos 40 = 10*0.77 = 7.7$ $V2y = -10*\sin 40 = 10*0.64 = -6.4$ $V\text{waypoint-}x = 10*\sin 30 = 10*0.5 = 5.0$ $V\text{waypoint-}y = 10*\cos 30 = 10*0.866 = 8.66$

| Table of Guidance Parameters | | |
|---|---|---|
| Vector | X component | Y component |
| Vwaypoint | +5.00 | +8.66 |
| V1 | −1.88 | +0.68 |
| V2 | −7.70 | +6.40 |
| Vpropulsion | −4.58 | +15.74 |

The vector direction of the propulsion angle needed is given by the arctangent of Vx/Vy, or arctan [4.58/15.74] =16.44 degrees west of north, as shown in FIG. 14B. The propulsion speed to deliver 10 mph toward the Waypoint is the square root of the sum of the squares of the two propulsion components, or 16.4 mph.

The Slave boat Aboat2 receives instructions for matching propulsion speed and direction from the Master Aboat1.

15. FIG. 15 Flow Chart Master-Slave Towing Operation

FIG. 15 is a flow chart describing the operation of a Master-Slave towing operation. The two autonomous boats performing the towing have an active two-way radio communications system wherein the Master updates the operational requirements for the Slave. The multiple towing boats are referred to as a "tow set." The steps start with activating a Master Control program on the first autonomous boat, and then activating a similar program on the second autonomous boat. The Master autonomous boat receives a first waypoint toward which the towing operation is to proceed.

In an embodiment, the Master Control determines the propulsion vector needed to tow the vessel toward the first defined waypoint, as was explained in the previous paragraph 14. The Master Control operation takes account of the effective wind and the current speeds. The propulsion speed and direction of travel for each autonomous boat is activated by the Master and the Slave boats.

A comparison of actual location to desired location along the path to the first waypoint is made periodically, as shown in the Flow chart.

The propulsion vector is updated periodically to account for any course deviations caused by changes in wind and current speeds. The rate of update is variable depending on the weather conditions. Update rates may vary from once a second to once a minute, or even longer.

As a first waypoint is approached, a second waypoint may be defined and the propulsion vector may be recalculated, as shown in the Flow Chart in FIG. 15.

In an embodiment, the master boat may be manned instead of being autonomous, and the second slave boat may be an autonomous unmanned boat.

In an embodiment, the slave boat may operate with different control algorithms, which enable a complementary path for the slave boat to follow, particularly when making path guidance changes involving turns. Both the master and the slave have the capability of adjusting tow cable tension, as described in para. 13 and shown in FIG. 13.

16. FIGS. 16A and 16B Autonomous Boat & Undersea Vehicle Block Diagram

FIG. 16A depicts two versions of the combination of an autonomous boat operating an undersea vehicle. In an embodiment, the first version in FIG. 16A depicts an autonomous undersea vehicle being controlled by an autonomous boat. In an embodiment, there is a communications link between the surface vessel and the subsea vessel. In an embodiment, this communications link may comprise a sonic communications system. In an embodiment, the communications link may comprise an optical communications system. In an embodiment, the communications link may comprise short-range radio communications system.

In an embodiment, the second version in FIG. 16B depicts an autonomous vehicle being controlled by an autonomous boat via a direct cable communications system, further comprising a wired system. In an embodiment, the communications system may comprise an optical system using fiber optics for the connection between the autonomous boat and the undersea vehicle.

Additional Material

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

While the invention has been described in connection with certain preferred embodiments, other embodiments would be understood by one of ordinary skill in the art and are encompassed herein.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) networks or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, C#, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A system for towing in tandem at least one target object located within a body of water, the system comprising:
 a plurality of autonomous marine platforms, wherein at least one of the autonomous marine platforms is an unmanned autonomous marine platform, each autonomous marine platform comprising:
  a propulsion and steerage system adapted to provide a propulsion speed and a direction of travel to the corresponding autonomous marine platform;
  a control system structured and arranged to provide signals to the propulsion and steerage system;
  a mechanical connection between the corresponding autonomous marine platform and the target object; and
  at least one sensing device operatively coupled to the mechanical connection and structured and arranged to sense at least one property of the mechanical connection and to communicate that sensed data; and
 an integrated control system structured and arranged to control the propulsion speed and direction of travel off each autonomous marine platform and adapted to:
  receive the sensed data from each sensing device;
  calculate, based on the sensed data and at least one desired property of the mechanical connection of at least one autonomous marine platform, at least one adjustment to be made to the corresponding autonomous marine platform; and
  transmit signals to the control system of at least one of the autonomous marine platforms to control at least one property of the mechanical connection based on such calculation, so as to control position and orientation of the target object on the body of water.

2. The system of claim 1, wherein each of the autonomous marine platforms is unmanned.

3. The system of claim 1, wherein the sensing device comprises at least one of a strain gauge sensor, a local measurement system, and a tension measurement system.

4. The system of claim 3, wherein at least one of the strain gauge sensor, the local measurement system, and the tension measurement system is at least one of embedded in and attached to the mechanical connection.

5. The system of claim 3, wherein at least one of the strain gauge sensor, the local measurement system, and the tension measurement system monitors tension in the mechanical connection continuously.

6. The system of claim 3, wherein at least one of the strain gauge sensor, the local measurement system, and the tension measurement system monitors tension in the mechanical connection periodically.

7. The system of claim 1, wherein the property of the mechanical connection comprises tension, and the integrated control system controls tension in the mechanical connection by adjusting at least one of a heading, a propulsion thrust level, and a direction of propulsion of the corresponding marine platform.

8. The system of claim 1, wherein the property of the mechanical connection comprises length, and the integrated control system controls the length by adjusting a winch to at least one of lengthen and shorten the length of the mechanical connection.

9. A method for towing in tandem at least one target object located within a body of water using a plurality of autonomous marine platforms, at least one of which is unmanned, each autonomous marine platform comprising a propulsion and steerage system adapted to provide a propulsion speed and a direction of travel to the corresponding autonomous marine platform, a control system structured and arranged to provide signals to the propulsion and steerage system, a mechanical connection between the corresponding autonomous marine platform and the target object, the method comprising:
  providing a mechanical connection between each autonomous marine platform and the target object;
  operatively coupling at least one sensing device to the mechanical connection;
  measuring a property of each mechanical connection;
  calculating, based on the measured property and at least one desired property of the mechanical connection, at least one adjustment to be made to the corresponding autonomous marine platform; and
  controlling, using an integrated control system and the calculated adjustment, the corresponding autonomous marine platform and a position and orientation of the target object on the body of water.

10. The method of claim 9, wherein the sensing device comprises at least one of a strain gauge sensor, a local measurement system, and a tension measurement system and measuring a property of each mechanical property comprises measuring tension in the mechanical connection.

11. The method of claim 10, wherein at least one of the strain gauge sensor, the local measurement system, and the tension measurement system is at least one of embedded in and attached to the mechanical connection.

12. The method claim 10, wherein at least one of the strain gauge sensor, the local measurement system, and the tension measurement system measures tension in the mechanical connection continuously.

13. The method claim 10, wherein at least one of the strain gauge sensor, the local measurement system, and the tension measurement system measures tension in the mechanical connection periodically.

14. The method of claim 9, wherein the property of the mechanical connection measured comprises tension, and the integrated control system controls tension in the mechanical connection by adjusting at least one of a heading, a propulsion thrust level, and a direction of propulsion of at least one of the marine platforms.

15. The method of claim 9, wherein the property of the mechanical connection measured comprises length, and the integrated control system controls the length by adjusting a winch to at least one of lengthen and shorten the length of the mechanical connection of at least one of the marine platforms.

16. An integrated control system for controlling a plurality of autonomous marine platforms towing in tandem at least one target object located within a body of water, wherein at least one of the autonomous marine platforms is an unmanned autonomous marine platform and each autonomous marine platform comprising a propulsion and steerage system adapted to provide a propulsion speed and a direction of travel to the corresponding autonomous marine platform, a control system structured and arranged to provide signals to the propulsion and steerage system, a mechanical connection between the corresponding autonomous marine platform and the target object, and at least one sensing device operatively coupled to the mechanical connection and structured and arranged to sense at least one property of the mechanical connections and to communicating that sensed data, the integrated control system comprising:
  a non-volatile memory for storing computer-executable instructions for controlling the marine platforms and the target object; and
  a processing device configured to execute some portion of the instructions stored in the non-volatile memory, the executed instructions adapted to cause the processing device to:
    receive sensed data from each sensing device on each corresponding marine platform;
    calculate, based on the sensed data and at least one desired property of the mechanical connection of at least one autonomous marine platform, at least one adjustment to be made to the corresponding autonomous marine platform and
    generate and transmit, based on such calculation, adjustment signals to the control system of at least one of the autonomous marine platforms to control at least one property of the mechanical connection, so as to control a position and orientation of the target object on the body of water.

17. The integrated control system of claim 16, wherein the property of the mechanical connection comprises tension, and the integrated control system controls tension in the mechanical connection by adjusting at least one of a heading, a propulsion thrust level, and a direction of propulsion of the corresponding marine platform.

18. The integrated control system of claim 16, wherein the property of the mechanical connection comprises length, and the integrated control system controls the length by adjusting a winch to at least one of lengthen and shorten the length of the mechanical connection.

* * * * *